United States Patent [19]

Seki et al.

[11] 3,863,059
[45] Jan. 28, 1975

[54] FAULT RECOGNITION APPARATUS FOR ARITHMETIC/LOGIC DEVICES

[75] Inventors: Susumu Seki; Makoto Noumi, both of Kokubunji; Tadashi Takaoka; Hisao Toriyama, both of Katsuta, all of Japan

[73] Assignee: Hitachi, Ltd., Tokyo, Japan

[22] Filed: Nov. 28, 1972

[21] Appl. No.: 310,091

[30] Foreign Application Priority Data
Dec. 2, 1971 Japan.............................. 46-97335

[52] U.S. Cl...................... 235/153 B, 235/153 AC
[51] Int. Cl. ............................................ G06f 11/06
[58] Field of Search ......... 235/153 B, 153 AC, 152, 235/156

[56] References Cited
UNITED STATES PATENTS

| | | | |
|---|---|---|---|
| 3,274,376 | 9/1966 | Evans et al. .................... | 235/150.31 |
| 3,581,074 | 5/1971 | Waltz............................ | 235/153 AC |
| 3,673,397 | 6/1972 | Schaefer..................... | 235/153 AC |
| 3,679,879 | 7/1972 | Seki et al. ..................... | 235/152 X |

OTHER PUBLICATIONS
Y. C. Lee, "Diagnosing Faults in a Computer", Technical Notes, RCA, Sept. 1969.

*Primary Examiner*—Felix D. Gruber
*Assistant Examiner*—David H. Malzahn
*Attorney, Agent, or Firm*—Craig & Antonelli

[57] ABSTRACT

A processing and control system in which fundamental arithmetic operations such as addition, subtraction and logic operations such as OR logic and AND logic required for various control operations including running a train at a constant speed and stopping the train at a predetermined position in each station are executed in time division fashion through a predetermined circulating route including an arithmetic circuit and a memory. In the control system, there is provided fault recognition apparatus wherein a predetermined arithmetic operation whose result is already known is executed periodically through the circulating route and the result of the operation is collated with a predetermined value for checking the arithmetic operations executed through the circulating route.

6 Claims, 3 Drawing Figures ns to car control systems and
FAULT RECOGNITION APPARATUS FOR ARITHMETIC/LOGIC DEVICES This invention relates to car control systems and more particularly to fault recognition means for recognizing the occurrence of faults in processing circuits used in a train control system which carries out various control operations including running the train at a constant speed, stopping the train at a predetermined position in each individual station, and running the train on schedule.

It is necessary to process data for executing arithmetic operations for the logical discrimination of the running speed of a train of for generating a predetermined pattern on the basis of a signal coming from the ground and a signal indicative of the detected running speed of the train, in order to carry out train control operations including running the train at a constant speed, stopping the train at a predetermined position in each individual station and running the train on schedule. Further, fundamental arithmetic operations such as addition, subtraction and logic operations such as AND logic and OR logic are required for such processing. In other words, required fundamental arithmetic elements are common to these control operations although the objects of these control operations are different from one another.

However, a plurality of groups of fundamental arithmetic elements for executing addition, subtraction, etc., and logic elements for executing AND logic and OR logic have heretofore been provided independently of one another for serving these different objects. Thus, not only a complex processing circuit is required in a control system of this kind, but also difficulty of fault recognition is a fatal defect for the train control system for which remarkably high safety is requested. In other words, due to the face that these fundamental arithmetic elements and logic elements are provided separately for individual control operations, the member of the elements is quite enormous and the checking of the operation of these elements independently of one another is impossible as a matter of fact in view of the period of time required therefor.

It is therefore an object of the present invention to provide novel and useful means capable of easily recognizing faulty fundamental arithmetic elements in a control system of this kind.

Another object of the present invention is to provide a car control system in which the fundamental arithmetic operations including addition and subtraction and logic operations including AND logic and OR logic are executed in time division fashion through a predetermined circulating route and any fault occurring in the system is checked by fault recognizing means at a predetermined point of the circulating route.

Other objects, features and advantages of the present invention will be apparent from the following detailed description when read in conjunction with the accompanying drawing, in which.

Figure 1:
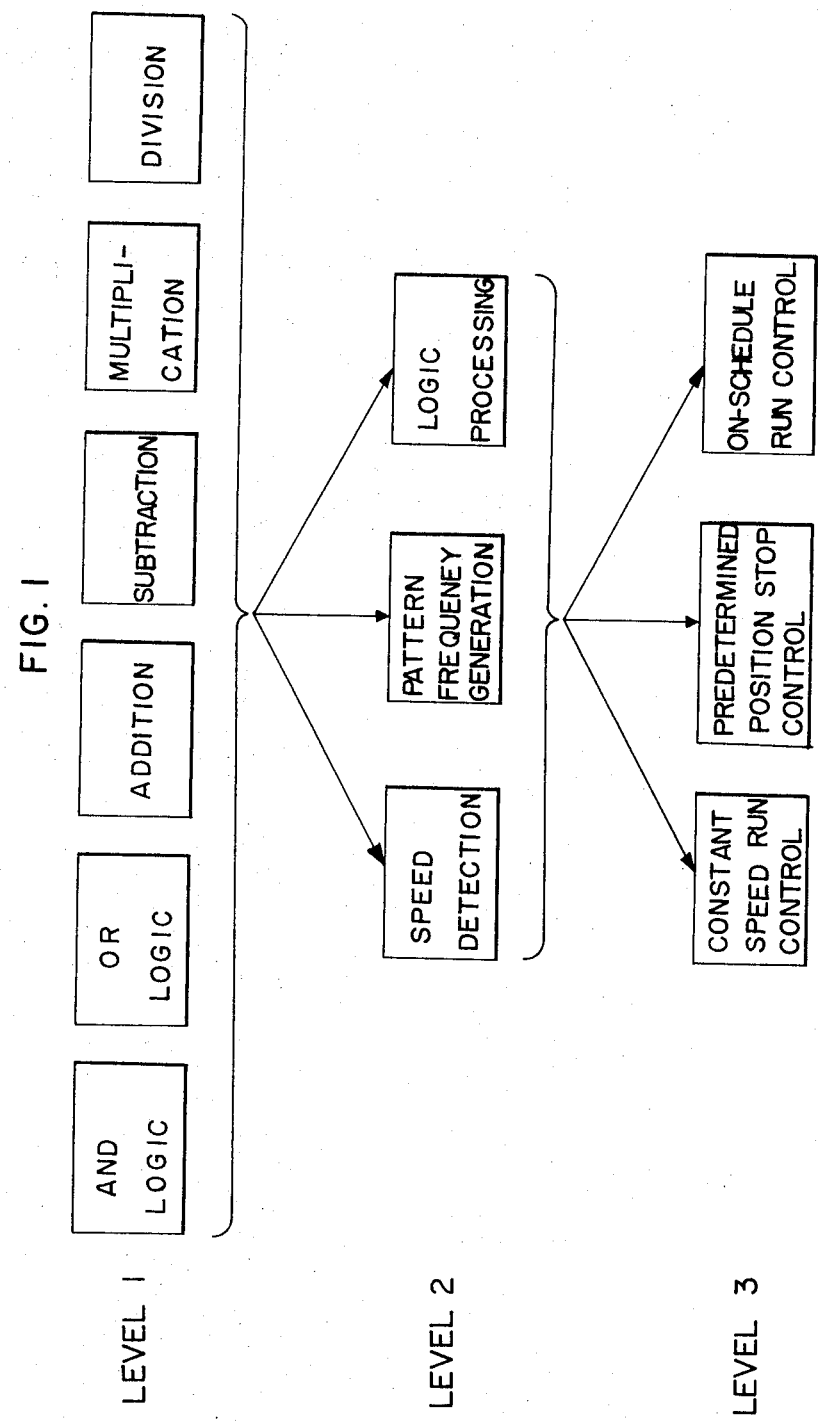
FIG. 1 is a schematic diagram illustrating the basic concept of the present invention.

Referring to FIG. 1 illustrating the basic concept of car control according to the present invention, logic elements for executing AND logic, OR logic and arithmetic elements for executing addition, subtraction, multiplication, division, etc., are suitably combined as shown at Level 1 for carrying out train speed detection, pattern frequency generation, logic processing and other functions as shown at Level 2, and the functions shown at Level 2 are suitably combined to carry out train control operations including running the train at a constant speed, stopping the train at a predetermined position in each individual station and running the train on schedule as shown at Level 3. The present invention is arranged so that the arithmetic operations at Level 1 required for the control operations shown at Level 3 can be executed in time division fashion.

Figure 2:
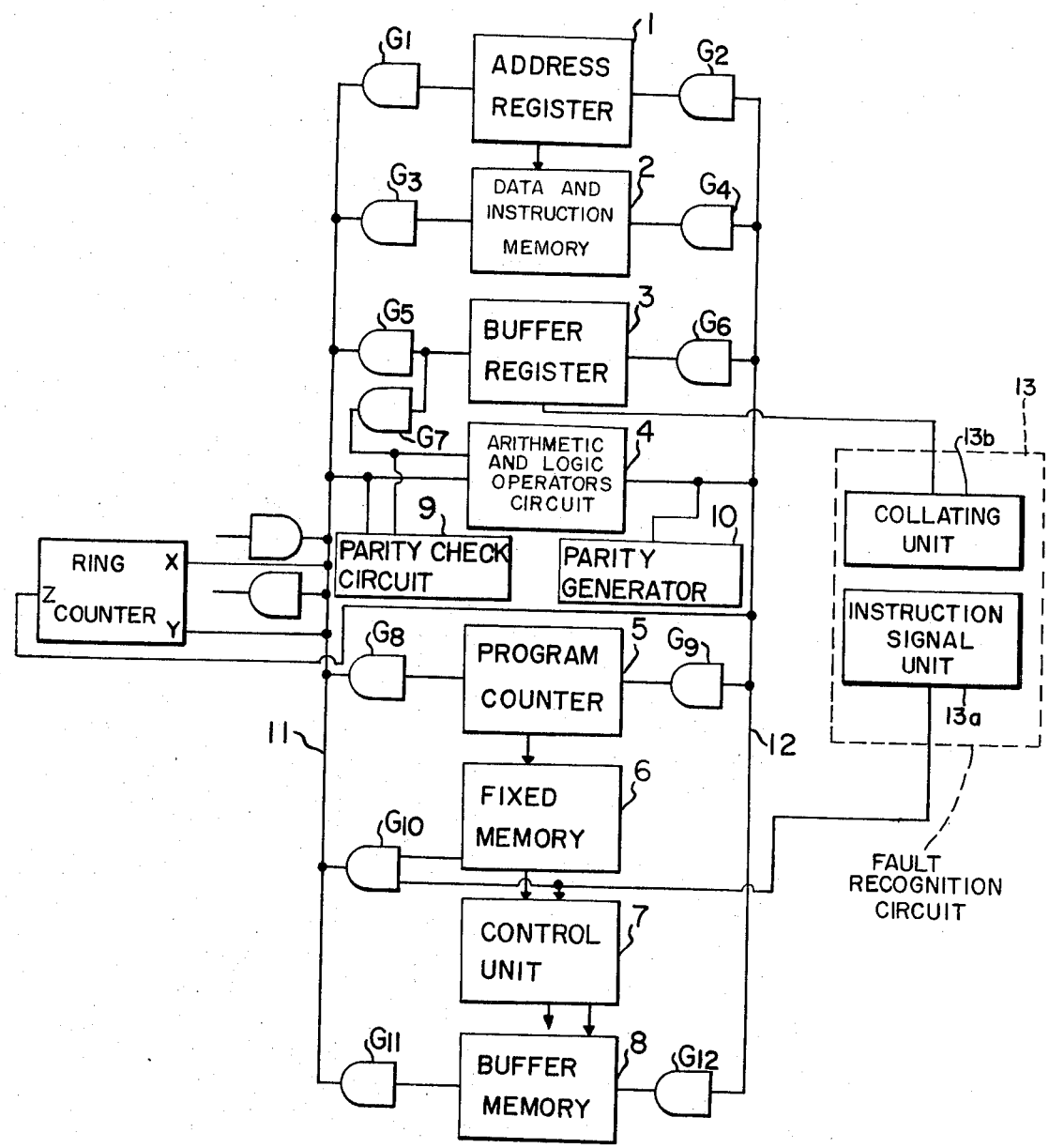
FIG. 2 is a block diagram of a car control system embodying the present invention.

An embodiment of the present invention for executing the arithmetic operations in the manner above described is shown in FIG. 2. Referring to FIG. 2, a car control system comprises an address register 1, a data memory 2, a buffer register 3, an arithmetic circuit 4, a program counter 5, a fixed memory 6, a control or switching unit 7, and a buffer memory 8. These means are connected between a pair of buses 11 and 12 through gates $G_1$ to $G_6$ and $G_8$ to $G_{12}$. A parity check circuit 9 and parity generator 10 are connected to the arithemetic circuit 4.

In such a control system, arithmetic and logic operations are executed in time division fashion. Data and instructions are stored in the data instruction memory 2 according to the order of arithmetic and logic operations. When an address of the data instruction memory 2 is specified by the address register 1, the specified data or instruction is delivered from the data instruction memory 2 to be applied to the buffer memory 8 through the gate $G_3$, bus 11, adder in the arithmetic and logic operations circuit 4 and gate $G_{12}$. The specific data or instruction put in the buffer memory 8 must be read out for arithmetic operation. It is the fixed memory 6 which determines the sequence and controls the gates.

The information applied to and stored in the buffer memory 8 is decoded in a manner as described below. At first, the instruction part of the data stored in the buffer memory 8 is read out. Suppose, for example, that the data stored in the buffer memory 8 consists of 8 bits in which the more significant 4 bits represent an instruction and the less significant 4 bits represent an address. Then, it is necessary to separate the more significant 4 bits from the less significant 4 bits. To this end, a pattern 11110000 is delivered from the fixed memory 6 to be stored in the buffer register 3.

The data previously applied to and stored in the buffer memory 8 is then applied to the arithmetic and logic operations circuit 4 through the gate $G_{11}$, and at the same time, the pattern 11110000 stored in the buffer register 3 is applied to the arithmetic and logic operations circuit 4 through the gate $G_7$ to obtain the logical product of the data and pattern. This operation leaves solely the more significant 4 bits of the data stored in the bufferr memory 8, and this instruction part is stored in the buffer memory 8 again.

The instruction stored in the buffer memory 8 again is decoded and the number corresponding to this instruction is applied to the program counter 5 through the gate $G_{11}$, bus 11, arithmetic and logic operations circuit 4 and gate $G_9$. The value stored in the program counter 5 specifies the address of the fixed memory 6 and the data at this address is delivered from the fixed memory 6. The output of the fixed memory 6 may be applied to the control unit 7 for controlling the gates or may be directly applied to the bus 11. For example, the gates $G_{11}$ and $G_7$ are opened when the contents of the buffer memory 8 are added to the contents of the buffer register 3 by the arithmetic and logic operations circuit 4. The gate $G_{12}$ is then opened for storing the output of the arithmetic and logic operations circuit 4 in the buffer memory 8.

The start and end of the arithmetic operations are indicated by the contents of the program counter 5. The arithmetic and logic operations are started when the count of the program counter 5 is zero and are ended when the count is restored to zero. Upon completion of one processing cycle, 1 is added to the contents of the address register 1 from the fixed memory 6 and the next instruction is read out from the data memory 2. Thereafter, the same operation is repeated.

It will be apparent from the above description that the arithmetic and logic operations are mainly executed through a predetermined route in the main arithmetic operation section. More precisely, data are circulated through the buses and registers by way of the route which is traced from the buffer memory 8 — bus 11 — arithmetic and logic operations circuit 4 — bus 12 to the buffer memory 8 or the route which is traced from the program counter 5 — bus 11 — arithmetic and logic operations circuit 4 — bus 12 to the program counter 5.

The parity check circuit 9 and parity generator 10 are connected to the circulating route for the purpose of simple checking, but these means alone are not capable of reliable fault recognition of the degree required for automatic train operation. In the field of this kind, many electrical parts such as integrated circuits and transistors are generally employed in the control circuit whose mean time between failures is required to be more than $10^6$ hours. If the control circuit includes thousands of such electrical parts and the mean time between failures of each of them is of the order of $10^7$ hours, it is impossible to ensure the overall mean time between failures of $10^6$. It has therefore been common practice to solve the above problem by providing such circuits in multiple since the fail-out would hardly occur in more than two circuits at the same time. For instance, a triple control system consisting of three control circuits is employed in ATO (Automatic Train Operation) adopted heretofore in the field of train control so that the signal can be delivered from the system only when the outputs of two or all of these control circuits coincide with each other. However, a control means which is fail-safe in itself is inevitably required in the case of a single or dual control system.

The fault recognition circuit 13 which includes an instruction signal unit 13a and a collating unit 13b in the present invention recognizes faults occurring in the system in a manner as described below. This fault recognition circuit 13 interrupts the otherwise continuous arithmetic and logical operations with predetermined timing and generates a fault recognition starting signal. In response to the generation of the fault recognition starting signal by the instruction signal 13a, the gate control by the fixed memory 6 and the supply of data through the buffer memory 8 are interrupted, and a gate control instruction is spontaneously generated from the control unit 7 for the purpose of fault recognition.

The fault recognition may be carried out in a manner as described below. The contents of the fixed memory 6 ranging from, for example, the address 1 to the address 256 are successively read out through the gate $G_{10}$ starting from the address 1 to be successively added by the arithmetic and logical operations circuit 4 and the sum is supplied to the buffer register 3. This operation is carried out by the route which is traced from the fixed memory 6 — gate $G_{10}$ — bus 11 — arithmetic and logical operations circuit 4 — bus 12 to the buffer register 3. The collating unit 13b of the fault recognition circuit 13 concludes that the system is normal when the sum coincides with a predetermined pattern. Alternatively, the fault recognition may be attained by reading out specific portions of the fixed memory 6 and circulating such portions through the normal arithmetic and logical operation route.

In the embodiment above described, all the arithmetic operations including addition, subtraction, multiplication, division, differentiation and integration are processed by the same system. However, execution of differentiation, integration, multiplication and division in addition to the addition and subtraction requires inevitably a long period of time and is disadvantageous from the aspect of the cost vs. performance. The period of time required for the arithmetic operations can be shortened by executing the addition and subtraction by the normal arithmetic operation route and executing the multiplication, division, differentiation and integration by a ring counter type arithmetic unit.

Figure 3:
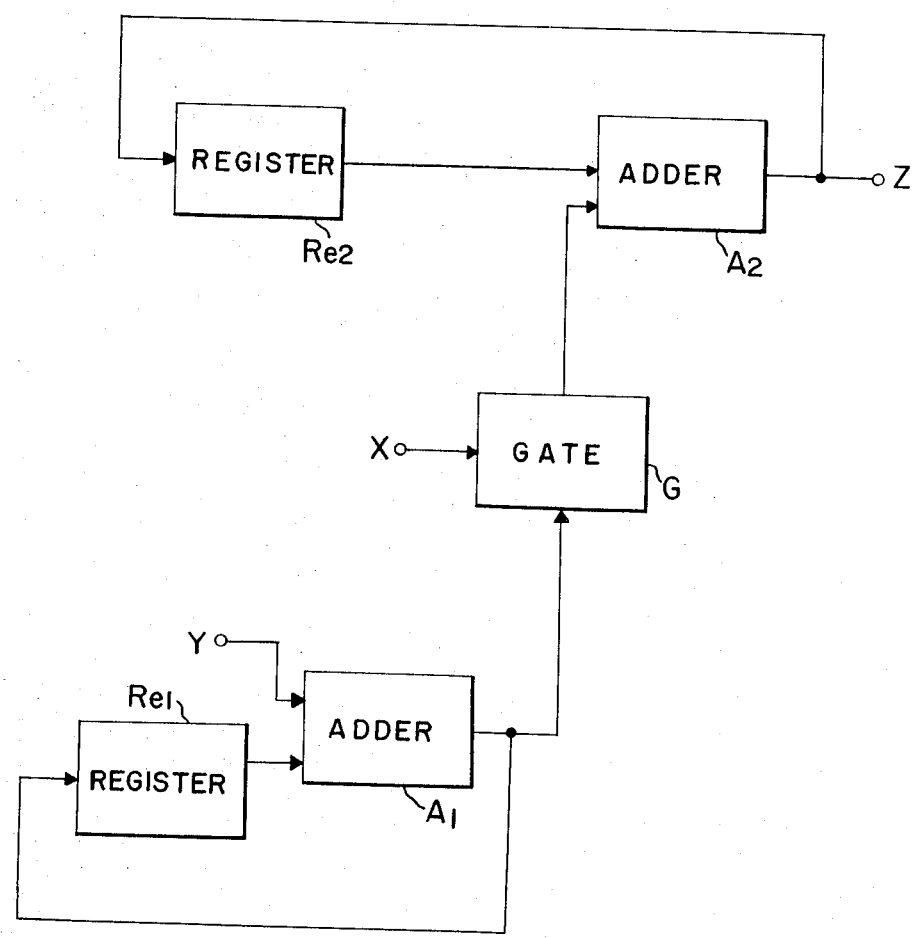
FIG. 3 is a block diagram of one form of arithmetic means preferably employed in the present invention.

FIG. 3 shows one basic form of such a ring counter type arithmetic unit. Referring to FIG. 3, the ring counter type arithmetic unit comprises a pair of registers $R_{e1}$ and $R_{e2}$, a pair of adders $A_1$ and $A_2$, a gate G, two signal input terminals X and Y, and one output terminal Z. The operation of this unit will be described with reference to integration of a function $y = f(x)$ with respect to $x$ by way of example. The register $R_{e1}$ has previously stored therein a preset value $yi$ of $y$. When an infinitesimal portion $\Delta y$ of $y$ is applied to the input terminal Y, the calculation $(yi + \Delta y)$ is executed by the adder $A_1$ and the result of addition is stored in the register $R_{e1}$ as new contents thereof. Then, when an infinitesimal portion $\Delta x$ of $x$ is applied to the input terminal X, the gate G is opened and the result of addition $(yi + \Delta y)$ and the existing contents of the register $R_{e2}$ are supplied to the adder $A_2$ to be added to each other. This means that the ring counter type arithmetic unit having such a structure can carry out calculation of $y.\Delta_x$. In other words, the calculation carried out by the arithmetic unit will be equivalent to integration of $y = f(x)$ with respect to $x$ when infinitesimal changes $\Delta x$'s of $x$ and corresponding infinitesimal changes $\Delta y$'s of $y$ are applied to the respective input terminals X and Y. Differentiation, multiplication and division can be similarly attained by the arithmetic unit of the type above described.

It will be understood that a control system, which is most inexpensive and is excellent in the cost vs. performance relation, can be obtained when addition and subtraction are executed by the circulating route described with reference to FIG. 2 and multiplication, division, differentiation and integration are executed by the ring counter type arithmetic unit described with reference to FIG. 3.

In the embodiment shown in FIG. 2, the fault recognition circuit 13 is solely provided for the purpose of fault recognition. Incorporation of the ring counter type arithmetic unit in the control system is advantageous in that the fault recognition can be more reliably and simply attained. In this case, the logical operation section or adding and subtracting section may act as a fault recognition means for the operation section of the ring counter or the latter may act as a fault recognition means for the former. Further, each of them may act as a fault recognition means for the other. For example, the contents of the fixed memory 6 ranging from the address 1 to the address 256 are successively read out starting from the address 1 and are successively added to be stored in the buffer register 3 in the manner described previously. The contents at these addresses are selected so that the total sum gives a predetermined value. Then, the result of the above addition stored in the buffer register 3 is applied as a preset value to the register $R_{el}$ in the ring counter shown in FIG. 3. The ring counter having been supplied with this preset value carries out a predetermined arithmetic operation, and when the result of the arithmetic operation gives a predetermined value, the operation section shown in FIG. 2 and the ring counter operation section shown in FIG. 3 are proved to be fault-free. If at least one of these operation sections is faulty, the result of the arithmetic operation carried out by the ring counter does not give the predetermined value, and thus, the fault can be easily recognized.

In the above description, the total sum of the contents at a plurality of predetermined addresses of the fixed memory 6 has been employed as the value to be preset in the register $R_{el}$ of the ring counter. However, a fault recognizing fixed memory may be separately provided for the ring counter so that it may generate a fixed pattern. In this case, recognition of faults occurring in the ring counter can solely be attained.

What is claimed is:

1. A processing and control apparatus comprising a pair of buses including a first and a second bus, memory means for storing data and instructions, a first and a second gate for connecting said memory means between said pair of buses, address register means for addressing said memory means, a third and a fourth gate for connecting said address register means between said pair of buses, buffer memory means for temporarily storing data and instructions read out from said memory means, a fifth and a sixth gate for connecting said buffer memory means between said pair of buses, a program counter, a seventh and an eighth gate for connecting said program counter between said pair of buses, fixed memory means for controlling the read out of instructions stored in said buffer memory means and the storage of said instructions into said program counter, a ninth gate connecting said fixed memory means to one of said pair of buses, an arithmetic and logic operation circuit means connected between said pair of buses for executing an operation in accordance with the contents of said fixed memory means due to the addressing of said program counter, and fault recognition system means including first means for producing an instruction signal, second means connected to said fixed memory means and said first means and being responsive to the instruction signal produced by said first means for interrupting the feed of output data from said fixed memory means and for providing a signal for controlling each of said gates for causing said arithmetic and logic operation circuit means to conduct a predetermined arithmetic operation, and third means coupled to said arithmetic and logic operation circuit means for collating a predetermined value with an operation result of the predetermined arithmetic operation.

2. A processing and control apparatus according to claim 1, wherein said first and second gates are connected respectively between an input of said memory means and said first bus and an output of said memory means and said second bus, said third and fourth gates are connected respectively between an input of said address register means and said first bus and an output of said address register means and said second bus, said fifth and sixth gates are respectively connected between an input of said buffer memory means and said first bus and an output of said buffer memory means and said second bus, said seventh and eighth gates are respectively connected between an input of said program counter and said first bus and an output of said program counter and said second bus, and said ninth gate is connected between an output of said fixed memory means and said second bus.

3. A processing and control apparatus according to claim 2, further comprising buffer register means, a 10th gate connected between an input of the buffer register means and said first bus and an 11th gate connected between an output of said buffer register means and said second bus, and a 12th gate connected between the output of said buffer register means and an input of said arithmetic and logic operation circuit means.

4. A processing and control apparatus according to claim 1, further comprising a ring counter-type arithmetic unit means connected to said buses for executing differentiation, integration, multiplication and division operations with said arithmetic and logic operation circuit means being connected so as to execute addition, subtraction and logic operations.

5. A processing and control apparatus according to claim 4, wherein said ring counter-type arithmetic unit means comprises a first circuit including a first register, means for adding a first input signal to the contents of said first register, and means for delivering the result of addition and applying the result to said first register, a second circuit including a second register, means for adding the output of said first circuit to the contents of said second register, and means for delivering the result of addition and applying the result to said second register, and a gate controlled by a second input signal for controlling the application of the signal from said first circuit to said adder in said second circuit.

6. A processing and control apparatus according to claim 5, further comprising buffer register means, a 10th and 11th gate for connecting said buffer register means between said pair of buses, and means for applying an output of said buffer register means to said first register of said ring counter-type arithmetic unit means as a preset value, said ring counter type arithmetic unit means being controlled to carry out a predetermined arithmetic operation with said preset value, and said third means of said fault recognition system means collating a predetermined value with an operation result of said predetermined arithmetic operation by said ring counter-type arithmetic unit means.

* * * * *